United States Patent
Enthaler et al.

(10) Patent No.: US 11,299,058 B2
(45) Date of Patent: Apr. 12, 2022

(54) ARRANGEMENT CONSISTING OF A MOTOR VEHICLE AND A CONNECTING MEANS, MOTOR VEHICLE AND CONNECTING MEANS

(71) Applicant: AUDI AG, Ingolstadt (DE)

(72) Inventors: Achim Enthaler, Ingolstadt (DE); Michael Muerken, Ingolstadt (DE); Andreas Thanheiser, Eichstaett (DE)

(73) Assignee: AUDI AG, Ingolstadt (DE)

( * ) Notice: Subject to any disclaimer, the term of this patent is extended or adjusted under 35 U.S.C. 154(b) by 142 days.

(21) Appl. No.: 16/314,934

(22) PCT Filed: Jun. 28, 2017

(86) PCT No.: PCT/EP2017/066068
§ 371 (c)(1),
(2) Date: Jan. 3, 2019

(87) PCT Pub. No.: WO2018/019510
PCT Pub. Date: Feb. 1, 2018

(65) Prior Publication Data
US 2019/0308521 A1 Oct. 10, 2019

(30) Foreign Application Priority Data
Jul. 29, 2016 (DE) ...................... 10 2016 214 050.7

(51) Int. Cl.
*B60L 53/65* (2019.01)
*B60L 53/30* (2019.01)
(Continued)

(52) U.S. Cl.
CPC ............ *B60L 53/65* (2019.02); *B60L 53/16* (2019.02); *B60L 53/305* (2019.02); *B60L 55/00* (2019.02);
(Continued)

(58) Field of Classification Search
CPC combination set(s) only.
See application file for complete search history.

(56) References Cited

U.S. PATENT DOCUMENTS

| | | | | |
|---|---|---|---|---|
| 2011/0202192 | A1* | 8/2011 | Kempton | G06Q 20/22 700/291 |
| 2013/0169226 | A1* | 7/2013 | Read | B60L 50/30 320/109 |

FOREIGN PATENT DOCUMENTS

| | | |
|---|---|---|
| CN | 103250320 A | 8/2013 |
| CN | 103764430 A | 4/2014 |

(Continued)

OTHER PUBLICATIONS

Examination Report dated Sep. 28, 2016 of corresponding German application No. 10 2016 214 050.7; 6 pages.
(Continued)

*Primary Examiner* — Richard V Muralidar
(74) *Attorney, Agent, or Firm* — Maier & Maier, PLLC (57) ABSTRACT

An arrangement consisting of a motor vehicle, including a battery, a charging connection and a charging device connected between the battery and the charging connection, and a connector. A first coupling which is or can be connected to the charging connection of the motor vehicle, and a second coupling which is connectable to an energy sink for power transport from the motor vehicle to the energy sink. The connector is designed for providing at least one item of power transport information to the motor vehicle. The charging device is designed for evaluating the item of power transport information or one of the items of power transport information and for specifying the direction of the power transport between the battery and the charging connection depending on the result of the evaluation.

14 Claims, 3 Drawing Sheets

(51) Int. Cl.
*B60L 53/16* (2019.01)
*H02J 7/00* (2006.01)
*B60L 55/00* (2019.01)
*B60K 6/20* (2007.10)

(52) U.S. Cl.
CPC .............. *H02J 7/0045* (2013.01); *B60K 6/20* (2013.01); *B60Y 2200/91* (2013.01); *B60Y 2200/92* (2013.01); *B60Y 2300/91* (2013.01); *H02J 7/00045* (2020.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/14* (2013.01)

(56) References Cited

FOREIGN PATENT DOCUMENTS

| | | |
|---|---|---|
| DE | 103 04 284 A1 | 8/2004 |
| DE | 10 2008 048 657 A1 | 3/2010 |
| DE | 10 2009 043 380 A1 | 4/2011 |
| DE | 10 2010 014 417 A1 | 10/2011 |
| DE | 10 2011 013 453 A1 | 9/2012 |
| DE | 10 2011 007 763 A1 | 10/2012 |
| DE | 10 2011 054 426 A1 | 4/2013 |
| DE | 10 2013 202 591 A1 | 8/2014 |
| DE | 10 2013 110 548 A1 | 3/2015 |
| EP | 2 557 746 A1 | 2/2013 |
| EP | 2 692 569 A2 | 2/2014 |
| EP | 2 733 815 A1 | 5/2014 |
| EP | 2 894 726 A1 | 7/2015 |
| EP | 2 982 535 A1 | 2/2016 |
| WO | 2010/065979 A2 | 6/2010 |

OTHER PUBLICATIONS

International Search Report dated Oct. 2, 2017 in corresponding International application No. PCT/EP2017/066068; 5 pages.
Written Opinion of the International Searching Authority dated Oct. 2, 2017 in corresponding International application No. PCT/EP2017/066068; 20 pages.
Notification of Transmittal of Copies of Translation of the International Preliminary Report on Patentability dated Feb. 7, 2019, in connection with corresponding international Application No. PCT/EP2017/066068 (8 pgs.).
Office Action dated Jul. 2, 2021 in corresponding Chinese Application No. 201780046835.2; 19 pages including English-language translation.

\* cited by examiner

ARRANGEMENT CONSISTING OF A MOTOR VEHICLE AND A CONNECTING MEANS, MOTOR VEHICLE AND CONNECTING MEANS

FIELD

The invention relates to an arrangement of a motor vehicle, with a battery, a charging connection and a charging device connected between the battery and the charging connection, and a connecting means, with a first coupling that is or can be connected to the charging connection of the motor vehicle, and a second coupling that is connectable to an energy sink for power transport from the motor vehicle to the energy sink. In addition, the invention relates to a motor vehicle and a connecting means.

BACKGROUND

A battery of a motor vehicle, especially an electric motor vehicle or a plug-in hybrid motor vehicle, can be charged by means of a connecting means, such as a charging cable, which is connected to a charging connection of the motor vehicle. The charging process is controlled by a charging device, also known as an on-board charger (OBC). The connecting means has a first coupling that is designed, for example, diametrically opposite the charging connection, and a second coupling that can be connected to an energy source providing electrical energy, such as a charging station.

Furthermore, bidirectional charging devices are known, by which electric power from the battery can be transported to an energy sink connected to the second coupling in the form of a public power grid. The battery here serves as a buffer storage for a so-called smart grid. Typically, in this case, however, an additional data link must be established between a power grid operator and the motor vehicle, in order to control the power transport to the power grid by means of the bidirectional charging device.

SUMMARY

The object of the invention is to make the energy stored in the battery more easily usable for delivery to an energy sink.

This object is achieved according to the invention by an arrangement of the kind mentioned above, wherein the connecting means is designed for providing at least one item of power transport information to the motor vehicle, wherein the charging device is designed for evaluating the power transport information and for specifying the direction of the power transport between the battery and the charging connection depending on the result of the evaluation.

The invention is based on the consideration, on the one hand, of providing a connecting means that is designed for connecting to a particular energy sink and for providing at least one item of power transport information, from which it can be deduced that the power transport should occur in the direction of the energy sink. On the other hand, the charging device is equipped such that it can only make a choice as to the direction in which the power transport will occur with the aid of the power transport information provided on the side of the connecting means. In the event of an energy sink connected via the connecting means, the power transport thus occurs from the battery by way of the charging connection and the connecting means to the energy sink. In other words, a decision as to whether energy should be furnished to the battery, for example, during a charging process by means of a charging cable, or whether energy should be withdrawn from the battery, can only be made depending on the power transport information to be evaluated by the charging device. Hence, since the charging device and the charging connection also enable a discharging of the battery, the latter may also be called a charging and discharging device or a charging and discharging connection.

The energy stored in the battery of the motor vehicle may thus be made usable for a multiple number of other purposes in addition to being used to propel the motor vehicle or to feed a public power grid, wherein the determination of the direction of the power transport requires no additional configuration measures, such as those using additional data links or operating inputs.

For example, the invention makes it possible, in simple manner, to employ a connecting means serving for the providing of a power grid connection as a second coupling for any desired consumer with a power plug. As compared to conventional power grid connections in motor vehicles that are supplied by way of an inverter from a low-voltage onboard network, significantly larger currents can flow across the connecting means providing the power grid connection at a grid voltage of 230 volts or 110 volts, for example, since the charging device is already designed for very high charging currents. In particular, even very power-hungry consumers can be supplied in this way, such as a hair dryer or a vacuum cleaner. In summary, an especially powerful stand-alone grid supplied by the battery of the motor vehicle can be provided.

Likewise, a connecting means can be used that serves for the purpose of connecting another motor vehicle or a charging cable connected to another motor vehicle to the second coupling and for charging the other motor vehicle by means of the charging device of the motor vehicle in the arrangement of the invention. Thus, for example, a jump starting as is known for motor vehicles with internal combustion engines can also be realized for electrically operated motor vehicles. In other words, the motor vehicle of the arrangement of the invention with the use of a corresponding connecting means can be operated as a virtual charging column. In both of the instances described above, the configuration of the charging device at least in terms of the direction of the power transport occurs solely with the aid of the evaluation of the power transport information provided on the side of the connecting means.

The battery can be equipped to supply a partly or fully electrically operated drive device of the motor vehicle. The battery may have a rated voltage of at least 60 volts, preferably at least 150 volts. The motor vehicle may be, for example, an electric motor vehicle (battery electric vehicle—BEV) or a plug-in hybrid electric vehicle (PHEV). The charging device, which may also be called an on-board charger (OBC), appropriately has a bidirectional converter device, by means of which a d.c. voltage on the side of the battery can be converted into an alternating voltage on the side of the charging connection, and vice versa. Furthermore, the charging device may have a control device, by means of which the power transport information can be evaluated and the direction of the power transport can be specified by actuating the converter device depending on the evaluation results. In the sense of the invention, power transport means exclusively a transport of active power. The charging connection is typically arranged accessible from the outside of the motor vehicle and may have a plug contact, or in other words, a male contact for a connection to the first coupling of the connecting means, especially designed to be diametrically opposite the charging connection. Basically, the connecting means can be designed as an adapter, having at the second coupling the opposite gender to that of the charging connection, i.e., a so-called gender changer.

Preferably, the power transport information or one of the items of power transport information describes a type of the connecting means and/or a connecting means-specific identifier and/or authentication data. By a type of the connecting means is meant a property of a plurality of similar connecting means, which, in particular, serve for the same purpose. A connecting means-specific identifier is assigned variously to several similar connecting means, especially connecting means of the same type. Moreover, authentication data serves to verify a connecting means in terms of its origin from a particular source, such as a particular manufacturer or supplier.

In addition or alternatively, the power transport information or one of the items of power transport information may describe a voltage and/or frequency and/or a maximum current strength to be provided at the charging connection. The connecting means accordingly may itself furnish information as to which electrical parameters it can operate with, especially as dictated by the make and model, without producing an unpermitted operating state. Likewise, the voltage or frequency or maximum current strength may refer to the energy sink that is or can be connected to the second coupling. In the already mentioned instance of a connection of the second motor vehicle to the second coupling, this may be the voltage and/or frequency and/or maximum current strength required by the other motor vehicle for the charging.

Moreover, it is further preferred if the charging device is designed to permit or prevent the power transport depending on the evaluation result. In particular, the charging device evaluates the type of the connecting means and/or the connecting means-specific identifier and/or the authentication data and/or the voltage and/or frequency and/or maximum current strength to be provided at the charging connection as to whether the charging device or the connecting means is suited to providing a corresponding power transport, and only allows a power transport if this is the case. Otherwise, the charging device may prevent the power transport, that is, in other words, reject the connecting means. In the case of the power transport information describing the type of the connecting means and/or the connecting means-specific identifier, a database can be saved for this purpose in a data storage unit of the charging device with permissible voltages and/or frequencies and/or maximum current strengths, which are retrievable and associated with different types and/or identifiers. Alternatively or additionally, the database may also associate a release of information with different types and/or identifiers. The charging device may check the transport information describing the authentication data as to whether the connecting means comes from a reliable source, such as the maker of the motor vehicle or a certified manufacturer. Appropriately, the charging device is designed to only allow the power transport if the authentication result is positive, and otherwise to prevent the power transport.

Furthermore, it is advantageous if the charging device is designed to control the power transport with a voltage and/or frequency and/or maximum current strength ascertained from the power transport information or one of the items of the power transport information. In particular, the charging device may be designed to ascertain the voltage and/or frequency and/or maximum current strength, especially directly from the power transport information describing the voltage and/or frequency and/or maximum current strength to be provided at the charging connection. Alternatively or additionally, the charging device may be designed to ascertain the voltage and/or frequency and/or maximum current strength from the power transport information describing the type of the connecting means and/or the connecting means-specific identifier. For this purpose, the database mentioned above can be used in similar manner.

Furthermore, it is of advantage if the connecting means comprises a communication device, by means of which the power transport information or one of the items of the power transport information can be transmitted wirelessly to the motor vehicle. In other words, the connecting means provides the power transport information to the motor vehicle, especially the charging device, by radio technology. It is moreover possible for the connecting means to have a control device, which is designed for bidirectional communication with the charging device. The communication device on the side of the connecting means may comprise an RFID means and/or be designed to transmit the at least one item of power transport information via a Bluetooth connection and/or by way of a data network. The data network in particular can be realized in accordance with a WLAN standard.

It is further preferred if the motor vehicle comprises a communication device, especially one installed on the side of the charging connection, by means of which the power transport information or at least one of the items of the power transport information can be received. The communication device on the side of the motor vehicle may be designed to activate the RFID means on the side of the connecting means and/or to receive the at least one transmitted item of power transport information via a Bluetooth connection and/or via the data network.

For an especially simple providing of the power transport information, the connecting means may comprise at least one resistance element, which is connected or connectable in an electrically conducting manner to a pair of contacts of the first coupling, and which is designed to encode the power transport information or one of the items of power transport information. For the encoding, the resistance element with a specific resistance value may be connected in an electrically conducting manner to two contacts of the first coupling forming the pair of contacts. Alternatively or additionally, a switching element may be provided, by means of which the resistance element or a resistance element can be connected by switching to the contacts of the contact pair. This also includes switching the resistance element to another resistance element connected permanently to the contacts.

It is also advantageous if the motor vehicle comprises a measurement device, which is designed to detect the encoded power transport information or at least one of the items of the encoded power transport information by measuring at least one resistance value between at least one pair of contacts of the charging connection. In particular, the contact pair of the charging connection may be connectable to that contact pair of the connecting means that is or can be connected to the at least one resistance element. The measurement device may be provided on the side of the charging device or on the side of the charging connection. The charging device may be designed to evaluate the resistance value or one of the resistance values and/or a change in the resistance value or one of the resistance values as power transport information or one item of the power transport information.

Moreover, the measurement device can be designed to measure the resistance value or one of the resistance values at a contact pair not provided for the power transport, especially comprising at least one pilot contact and/or one grounded contact. By power transport is meant here the power transport from the battery to the charging connection, and specifically not a possible power transport that occurs by applying a measurement voltage in order to perform the measurement of the resistance value. The pilot contact or a pilot contact may be the Control Pilot (CP) and/or the Proximity Pilot of a coupling according to IEC 62196.

Preferably, an additional item of power transport information describes whether the energy sink is in contact with the connecting means, especially its second coupling, wherein the charging device is designed to disable the providing of an output voltage until a contact of the energy sink with the connecting means is ascertained. This ensures that the power transport only occurs if an energy sink is in contact with the second coupling, whereby this remains voltage-free for safety reasons in the uncontacted state. The additional power transport information may be provided by the connecting means analogously to the above described at least one item of power transport information. For example, it is conceivable to design the switching element to switch in a resistance element between a pair of contacts, especially between a pilot contact and the protective conductor, upon detecting a contacting of the energy sink. Moreover, the control device on the side of the connecting means may be designed to check whether the energy sink is contacted with the second coupling, and to provide the corresponding power transport information for the communication device on the side of the connecting means.

Furthermore, the measurement device or a measurement device on the side of the motor vehicle may be designed to obtain the additional item of power transport information by measuring a resistance value between a contact pair contributing to the power transport, especially comprising an external conductor and a neutral conductor, of the charging connection. Accordingly, the change in resistance resulting from the contacting of the energy sink with the second coupling may be evaluated as additional power transport information, making possible an especially simple detection as to whether the energy sink is contacted. Appropriately, the charging device is designed to enable the power transport only upon a drop below a resistance threshold value of the measured resistance value between the pair of contacts contributing to the power transport or to only then provide an output voltage.

It is further of advantage if the charging device is designed to allow the power transport only upon receiving an operating signal generated by an operating input, which can be generated by activating at least one operating element on the side of the the motor vehicle, especially an operating element on the side of the charging connection and/or an operating element situated in the interior of the motor vehicle, and/or by a radio signal received via a data radio interface, especially a portable communication device on the side of the motor vehicle. Moreover, the charging device may be designed to disable once again the power transport upon receiving another operating signal generated by an operating input. The operating element situated in the interior of the motor vehicle is realized for example by a human/machine interface (HMI). As regards the portable communication device, it is preferable for the operating signal to be triggered by a mobile application (app).

Furthermore, a locking element is provided on the side of the motor vehicle, this element being designed to lock the connecting means in a state plugged into the charging connection on the motor vehicle. The locking element may be controllable by way of the control device on the side of the charging device. In particular, the locking occurs depending on the evaluation result of the power transport information or one item of the power transport information, wherein the authentication data, for example, may describe the evaluated power transport information.

Preferably, a display device is provided on the side of the charging connection and/or in the interior of the motor vehicle, which can be controlled by the charging device to visualize the power transport, especially its direction. A light-emitting diode may be provided on the side of the charging connection as the display device. The display device in the interior may also be realized by a human/machine interface. Moreover, it is possible to design the data interface or a data interface on the side of the motor vehicle to relay a radio signal, especially to the portable communication device, whereby the radio signal includes information that can be processed to visualize the power transport. In particular, the visualization of the power transport then occurs by means of the mobile application.

The motor vehicle may also comprise a receptacle for a power plug installed in its interior, wherein the charging device is moreover designed to specify an additional power transport in the direction of the receptacle and to disable the providing of an output voltage at the receptacle until a consumer plugged into the receptacle has been detected. Thus, the especially high power put out by the battery and the charging device may be provided to a receptacle installed in the interior of the motor vehicle, which is conventionally supplied only by a less powerful low-voltage network of the motor vehicle. In addition, it is ensured that a voltage is only present at the receptacle when a consumer has also been plugged into the receptacle.

Appropriately, the charging device for this purpose comprises a switching device, which can be actuated by the control device on the side of the charging device. The switching device may be switched in between the converter device of the charging device and the charging connection. The switching device is preferably designed to connect the converter device in a first switching state only to the charging connection, and in a second switching state only to the receptacle, and in a third switching state to the charging connection and the receptacle, and in a fourth switching state to disconnect the charging connection and the receptacle from the converter device. Moreover, it is preferred that the switching device is designed as a separate component. The receptacle may have a child safety feature.

In one preferred embodiment of the connecting means, especially when it provides a power grid connection at the second coupling, it may comprise a cable connecting the first coupling and the second coupling. The power grid connection may have a child safety feature.

In another preferred embodiment of the connecting means, especially when this is provided for charging another motor vehicle, the first coupling and the second coupling are arranged in a common coupling housing. Such a connecting means is characterized by especially compact dimensions and it may be included in a motor vehicle in order to charge the other motor vehicle when needed, i.e., to provide assistance when the other motor vehicle is stranded on account of a dead battery.

In regard to these two embodiments, it is moreover preferable for the second coupling to comprise contacts designed for plugging in a power plug or a charging cable for another motor vehicle, especially female contacts.

The object of the invention is moreover achieved according to the invention by a motor vehicle for an arrangement according to the invention consisting of the motor vehicle according to the invention and a connecting means. All the remarks about the motor vehicle belonging to the arrangement according to the invention may be applied analogously to the motor vehicle, so that the aforementioned benefits may also be achieved therewith.

In addition, the object of the invention is achieved according to the invention by a connecting means for an arrangement according to the invention consisting of a motor vehicle and the connecting means according to the invention. All the remarks about the connecting means belonging to the arrangement according to the invention may be applied analogously to the connecting means, so that the aforementioned benefits may also be achieved therewith.

Moreover, a method is disclosed for operating an arrangement consisting of a motor vehicle, comprising a battery, a charging connection and a charging device connected between the battery and the charging connection, and a connecting means, comprising a first coupling that is or can be connected to the charging connection of the motor vehicle, and a second coupling that is connectable to an energy sink for power transport from the motor vehicle to the energy sink, wherein the connecting means is designed for providing at least one item of power transport information to the motor vehicle, wherein the charging device evaluates the power transport information or one of the items of the power transport information and specifies the direction of the power transport between the battery and the charging connection depending on the result of the evaluation. All the remarks about the arrangement according to the invention may be applied analogously to the method, so that the aforementioned benefits can also be achieved therewith.

Further benefits and details of the invention will emerge from the exemplary embodiments described below and also with the aid of the drawings. These are schematic representations and they show:

DETAILED DESCRIPTION

Figure 1:
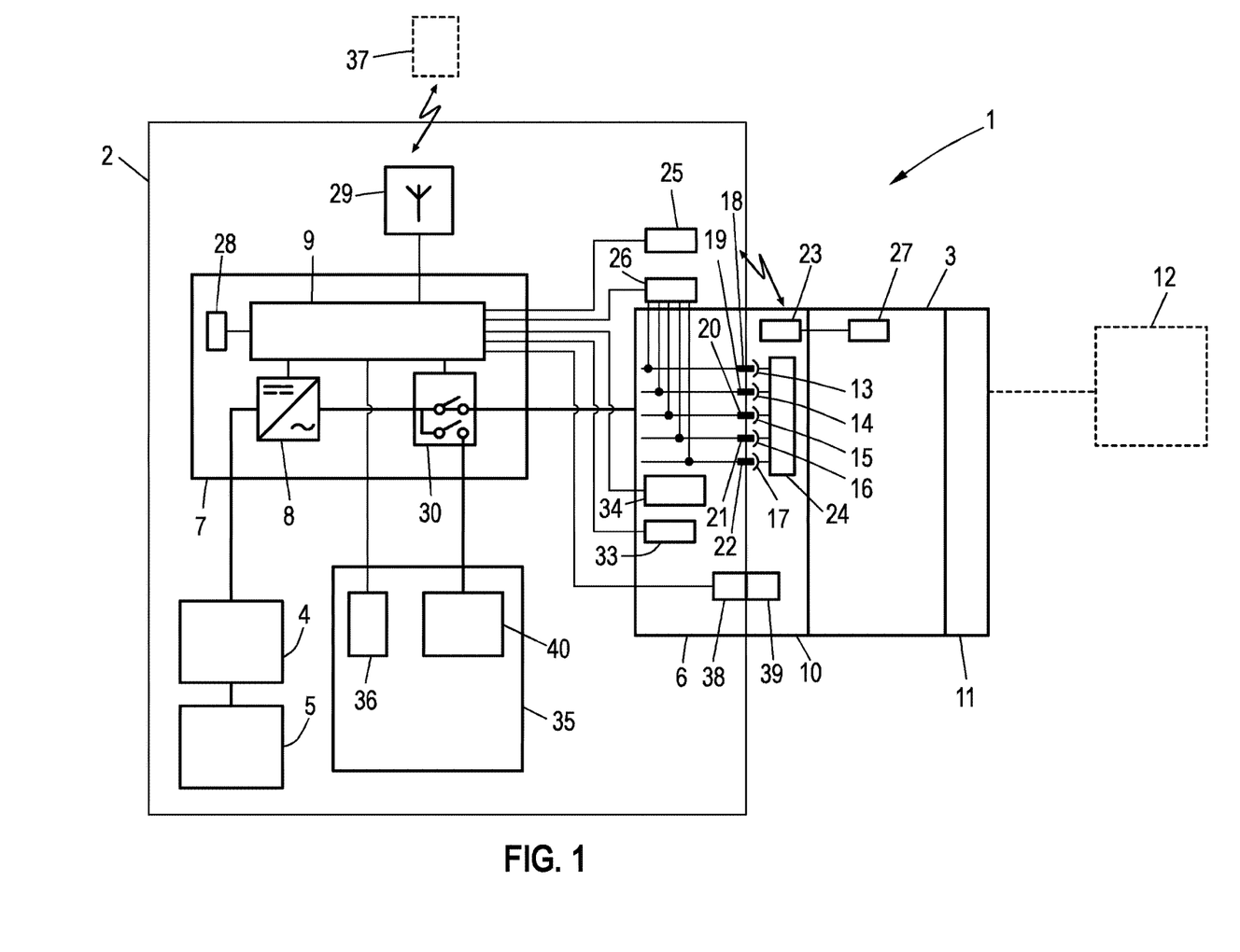
FIG. 1 a schematic diagram of an arrangement consisting of a motor vehicle and a connecting means according to the invention.

FIG. 1 shows a schematic diagram of an arrangement 1 consisting of a motor vehicle 2 and a connecting means 3.

The motor vehicle 2 is an electric motor vehicle (battery electric vehicle—BEV) or a plug-in hybrid electric vehicle (PHEV) and it has a battery 4 with a rated voltage of 200 volts, for example, which is designed to supply a fully or partly electrically operated drive device 5. For the charging of the battery 4, a charging connection 6 is provided, accessible from the outside of the motor vehicle 2, being connected by way of the charging device 7 to the battery 4. The charging connection 6 can be connected, for example, to a charging cable for connecting the motor vehicle 2 to an external charging station or charging column. The charging device 7 has a converter device 8 in the form of a bidirectional AC/DC converter. The converter device 8 is thus designed to convert a d.c. voltage on the side of the battery into an alternating voltage on the side of the charging connection, and vice versa. In order to specify the direction of a power transport, i.e., from the battery 4 to the charging connection 6, or vice versa, the converter device 8 can be actuated by the control device 9.

The connecting means 3 can be connected to the charging connection 6 by means of a first coupling 10 and is shown in FIG. 1 in the connected condition. A second coupling 11 of the connecting means 3 serves for connecting it to an energy sink 12, which is not part of the arrangement 1. The first coupling 10 comprises multiple female contacts 13-17, which, in the connected condition of the connecting means 3, are connected in an electrically conducting manner to multiple plug contacts 18-22 of the charging connection 6. The first coupling 10 is thus designed diametrically opposite the charging connection 6, for example, according to IEC 62196, especially type 2. For simplicity, FIG. 1 shows only one socket contact 13 and one plug contact 18 for one of three external conductors. A neutral conductor is led via the socket contact 14 and the plug contact 19, a protective conductor is led via the socket contact 15 and the plug contact 20, a first pilot line (e.g., the control pilot) is led via the socket contact 16 and the plug contact 21, and a second pilot line (e.g., the proximity pilot) is led via the socket contact 17 and the plug contact 22.

The connecting means 3 provides multiple items of power transport information to the motor vehicle 2 by way of a communication device 23 and a resistance network 24 on the side of the connecting means, these items being detected by a communication device 25 on the motor vehicle side and by a measurement device 26 on the motor vehicle side and provided to the control device 9. The control device 9 is designed to evaluate the power transport information items and, depending on the evaluation results, to specify the direction of the power transport between the battery 4 and the charging connection 6.

In the following, a transmission of the power transport information by way of the communication devices 23, 25 shall be explained first:

The communication devices 23, 25 are in communication by means of a Bluetooth connection, whereby a control device 27 on the side of the connecting means actuates the communication device 23 to transmit the power transport information. The power transport information to be transmitted is saved in the control device 27 and describes the type of the connecting means 3, a connecting means-specific identifier, authentication data, and a voltage, frequency, and maximum current strength to be provided at the charging connection. Another item of power transport information describes whether the energy sink 12 is contacted by the second coupling 11 of the connecting means 3. As the connecting means 3 approaches the charging connection 6 or as the first coupling 10 is inserted into the charging connection 6, the communication device 23 on the side of the connecting means establishes the Bluetooth connection to the communication device 25 on the motor vehicle side and transmits all the power transport information to it.

The control device 9 then evaluates this. From the power transport information describing the type and the identifier, the control device 9 determines, by polling a database called up in a data storage unit 28 or through a data interface 29 on the motor vehicle side, whether the connecting means 3 is compatible with the motor vehicle 2, and which direction of power transport is specified. Since the connecting means 3 in the present instance is designed for connecting the energy sink 12 to the motor vehicle 2, the control device 9 evaluates the power transport information in regard to a power transport specified in the direction from the battery 4 to the charging connection 6. By evaluating the power transport information describing the authentication data, the control device 9 determines whether the connecting means 3 comes from a reliable source, such as the same manufacturer as the motor vehicle 2 or from a certified manufacturer. From the power transport information describing the voltage, frequency and maximum current strength to be provided, the control device 9 moreover determines whether the charging device 7 is designed to realize a power transport via the connecting means 3. Alternatively, the voltage, frequency, and maximum current strength to be provided can also be retrieved from one of the previously described databases and thus determined solely from the power transport information describing the type and/or the identifier.

If the aforementioned evaluations are positive, the control device 9 will allow a power transport from the battery 4 to the charging connection 6 and thus basically also by way of the connecting means 3 to the energy sink 12. At the same time, it configures the converter device 8 to provide the voltage and the frequency and to limit the power transport to the maximum current strength.

Moreover, the control device 9 evaluates the additional power transport information describing whether the energy sink 12 is contacted with the second coupling 11, and it actuates a switching device 30 connected to the converter device 8 to apply an output voltage to the charging connection 6 only if a contacting of the energy sink 12 was ascertained. The contacting state of the energy sink 12 with regard to the second coupling 11 is ascertained by the control device 27 on the side of the connecting means.

According to another exemplary embodiment, the communication devices 23, 25 communicate by way of a data network established according to a WLAN standard. According to another exemplary embodiment, the communication device 23 is or comprises a passive RFID means, in which the control device 27 may also be integrated and which can be activated by the communication device 25 on the motor vehicle side to transmit the power transport information.

Figure 2:
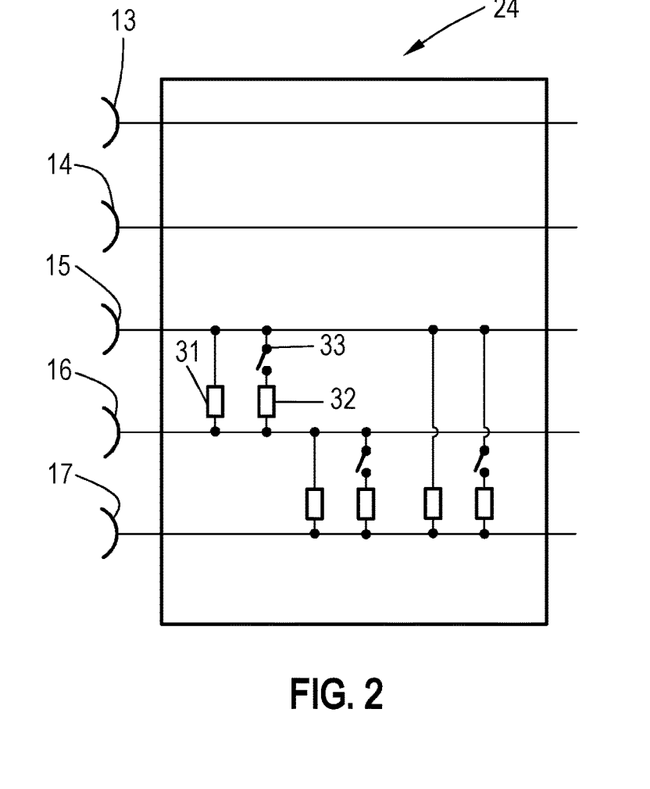
FIG. 2 an illustration of a detail of a resistance network of the connecting means shown in FIG. 1.

Alternatively or additionally to providing the power transport information by means of the communication devices 23, 25, this information is provided entirely or partially with the aid of the resistance network 24 on the side of the connecting means. FIG. 2 shows a schematic diagram of the resistance network 24, wherein a first resistance element 31 is situated between a respective pair of contacts formed from two of the female contacts 15-17 and, in parallel with this, a second resistance element 32 can be switched in by means of a switching element 33 controllable by the control device 27. Since the female contacts 15-17 carry the protective conductor and the pilot contacts, these do not contribute significantly to the power transport along the external conductor and the neutral conductor. Therefore, power transport information can likewise be encoded via the resistance values of the respective resistance elements 31, 32. In particular, a change in state detected by the control device 27, such as the contacting of the power sink 12 by a switching in of the second resistance element 32 can be encoded.

The measurement device 26 shown in FIG. 1 is designed to measure the resistance values between the plug contacts 20-22 that do not contribute to the power transport, said values resulting from the respective resistance elements 31, 32 connected on the side of the connecting means. The power transport information encoded by the resistance elements 31, 32 and hence provided on the side of the connecting means is evaluated by the control device 9 on the basis of the measurement data.

According to another exemplary embodiment, the measurement device 26 is further designed to detect a resistance change between the plug contacts 18, 19 which, as the external conductor and neutral conductor, realize the power transport. Such a resistance change arises by the contacting of the energy sink 12 to the second coupling 11, so that the additional power transport information describing the contacting state of the energy sink 12 can also be detected by the resistance change between the plug contacts 18, 19, alternatively or in addition to the relaying by means of the communication devices 25, 26 and the switching in of a resistance element 32.

Figure 3:
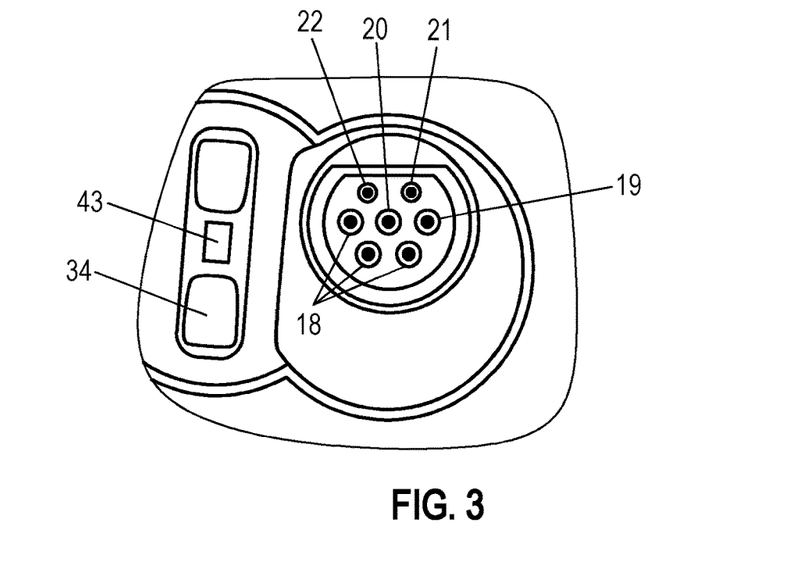
FIG. 3 an illustration of a detail of a charging connection of the motor vehicle shown in FIG. 1.

FIG. 3 shows a detail representation of the charging connection 6 on the motor vehicle side, comprising the plug contacts 18-22, where three plug contacts 18 are provided for each external conductor of different phase. Moreover, on the side of the charging connection there is provided an operating element 34, which, when activated, produces an operating signal. This can be detected by the control device 9, which is further designed to allow the power transport only after detecting the operating signal. Alternatively or additionally, a corresponding operating signal can be triggered by an operating element situated in an interior 35 of the motor vehicle 2, such as a Human/Machine Interface (HMI) 36. Alternatively or additionally, a corresponding operating signal can be received by means of the data interface 29 from a portable communication device 37, such as a smartphone on which a mobile application (app) is installed for control of the charging device 7. The control device 9 is moreover designed to disable once more the power transport upon receiving another operating signal by the aforementioned channels. However, an enabling of the power transport by virtue of the evaluation of the power transport information will basically remain in place even after receiving such an operating signal, so that, in other words, the charging device stays in a stand-by mode.

In addition, there is provided on the side of the charging connection a display device 43, such as one comprising a light-emitting diode, which visualizes the direction during the power transport. Alternatively or additionally, the direction of the power transport can be visualized by means of a display device situated in the interior 35, such as the human/machine interface 36, or the mobile application.

The charging connection 6 further comprises a locking element 38, which locks the connection element 3 by means of another locking element 39 after a successful evaluation of the power transport information to the effect that a power transport is possible by way of the charging connection 6 in the direction of the connecting element 3.

The motor vehicle 2 furthermore has a receptacle 40 for a power plug installed in its interior 35, such as a safety plug. The charging device 7 is moreover designed to allow another power transport to the receptacle 40, so that electrical consumers with a high power demand can also be operated by it.

For safety reasons, however, the providing of an output voltage at the receptacle 40 is only provided when a power plug is connected to it. For this purpose, by the plugging in of the power plug, the measurement device 26 likewise measures by measurement lines, which are not shown for sake of clarity, a resistance change between conductors provided for the power transport to the receptacle 40. The control device 9 is moreover designed to actuate the switching device 30 only to allow a power transport to the receptacle 40 or to apply an output voltage to the receptacle 40 if the measurement device has detected a corresponding resistance change.

Figure 4:
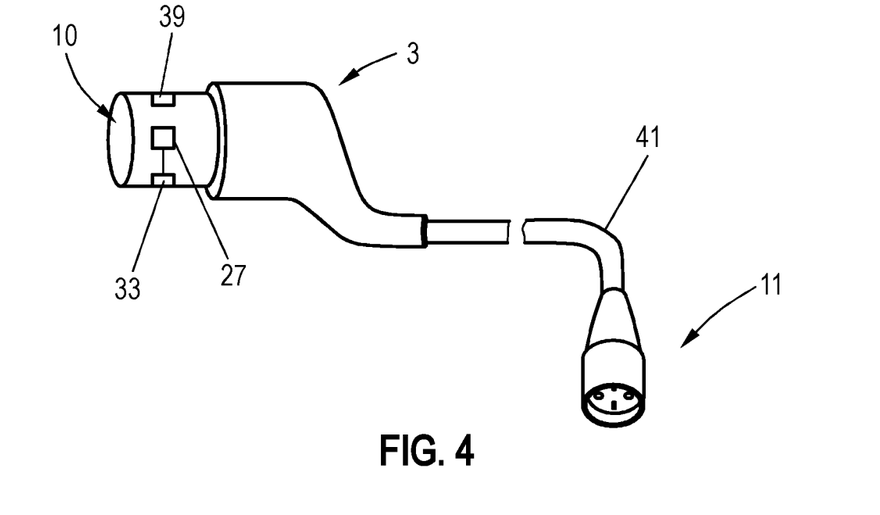
FIG. 4 an exemplary embodiment of a connecting means according to the invention.

FIG. 4 shows an exemplary embodiment of another connecting element 3, corresponding to the connecting element 3 shown in FIG. 1. The first coupling 10 comprises the female contacts 13-17 and is connected by a cable 41 to the second coupling 11, which is designed to plug in a power plug, and thus likewise comprises female contacts. At the first coupling 10 there is provided the locking element 39, as can be seen, which can engage with a hook-shaped locking element 38 on the side of the charging connection. In addition, a child safety feature (not shown) is provided at the second coupling 11.

The control device 27 provides power transport information comprising the type of the connecting element 3 as an adapter cable, a serial number of the connecting element 3 as an identifier, and authentication data assigned by the manufacturer. In addition, power transport information is provided, describing the current carrying capacity of the cable 41 as the maximum current strength and the voltage of 230 volts provided for the safety plugs and the frequency of 50 Hertz provided. Of course, the second coupling 11 may also be designed for the plugging in of power plugs of other standards and accordingly provide other power transport information, such as that describing a voltage of 110 volts and a frequency of 60 Hertz.

Alternatively or additionally, the aforementioned power transport information may also be entirely or partially encoded by a resistance network 24 according to FIG. 2.

Figure 5:
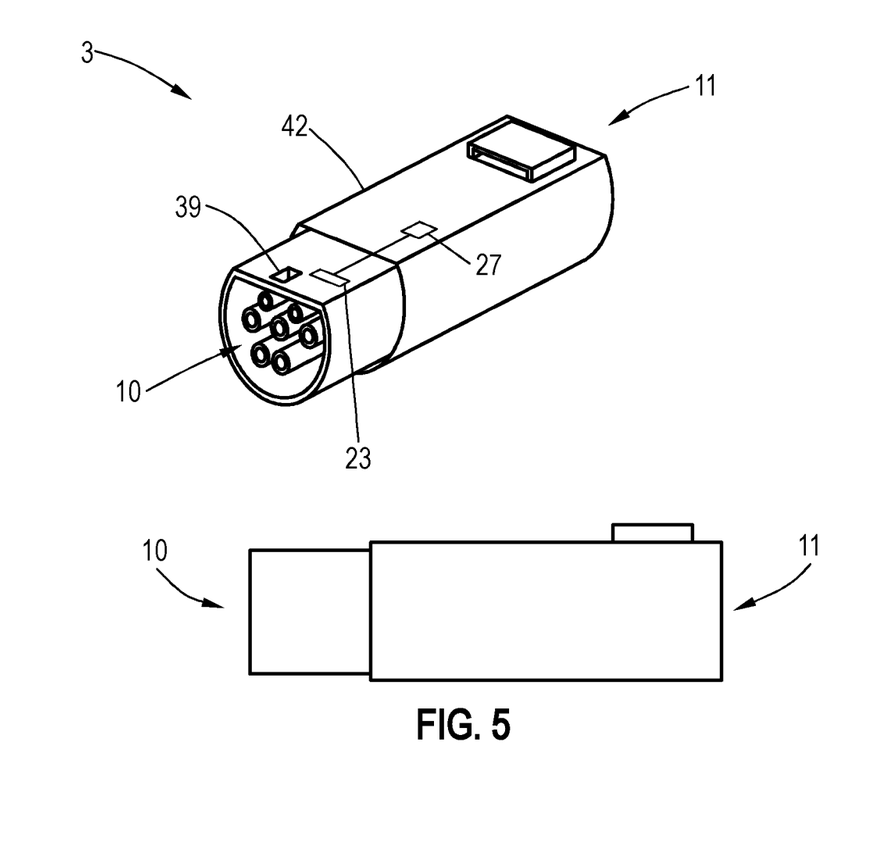
FIG. 5 perspective views of another exemplary embodiment of a connecting means according to the invention.

FIG. 5 shows a perspective view of another exemplary embodiment of a connecting means 3, corresponding to the connecting means 3 shown in FIG. 1. The first coupling 10 and the second coupling 11 are arranged in a common coupling housing 42. Contacts of the second coupling 11 not visible in FIG. 5 are designed as female contacts. A traditional charging cable, which can usually be connected to a charging column, may be connected to the second coupling 11.

The connecting means 3 accordingly functions as a gender changer and makes it possible to connect another motor vehicle to the second coupling 11 and transport power from the motor vehicle 2 to the other vehicle. The motor vehicle 2 may thus be operated as a "virtual" charging column, for example, in order to charge a dead battery of another stranded motor vehicle. Thus, the jump starting known for traditional motor vehicles with internal combustion engines can also be realized for electrically operated motor vehicles.

By way of the communication device 23, the control device 27 furnishes power transport information describing the connecting means 3 as such a charging accessory and also describing a serial number and authentication data similar to the connecting means 3 shown in FIG. 4. In addition, the control device 27 is designed to ascertain information regarding the charging operation to be conducted for the other motor vehicle, describing the voltage, frequency, and maximum current strength to be used, and to provide this information to the motor vehicle 2 as power transport information.

The invention claimed is:

1. An arrangement of a motor vehicle, comprising:
    a battery, a charging connection and a charging device connected between the battery and the charging connection, and
    a connector which has a first coupling, which is connectable to and detachable from the charging connection of the motor vehicle, and a second coupling, which is connectable to and detachable from an energy sink for power transport from the motor vehicle to the energy sink,
    wherein the connector is formed as a cable which connects the first coupling with the second coupling,
    wherein the connector is designed for providing at least one item of power transport information to the motor vehicle,
    wherein the connector comprises a controller and a communication device,
    wherein the controller stores the power transport information or one of the items of the power transport information and actuates the communication device by which the power transport information or one of the items of the power transport information can be transmitted wirelessly from the connector to the motor vehicle,
    wherein the charging device is designed for evaluating the power transport information or one of the items of power transport information and for specifying the direction of the power transport between the battery and the charging connection, depending on the result of the evaluation,
    wherein the power transport information or one of the items of the power transport information further comprises information describing a type of the connector and/or a connector-specific identifier specific to the connector,
    wherein the charging device comprises a data storage unit which stores a database containing information which relates the type of the connector and/or the connector-specific identifier to at least permissible voltages and/or frequencies and/or maximum current strengths, and
    wherein, upon receipt of the power transport information or one of the items of the power transport information, the charging device is configured to retrieve the permissible voltages and/or frequencies and/or maximum current strengths from the data storage unit for carrying out the power transport.

2. The arrangement as claimed in claim 1, wherein the power transport information or one of the items of power transport information describes and/or authentication data and/or a voltage and/or frequency and/or a maximum current strength to be provided at the charging connection, wherein the charging device is designed to permit or prevent the power transport depending on the evaluation result and/or to control the power transport with a voltage and/or frequency and/or maximum current strength ascertained from the item or items of power transport information.

3. The arrangement as claimed in claim 1, wherein the motor vehicle has a communication device, especially one installed on the side of the charging connection, by which the power transport information or at least one of the items of the power transport information can be received.

4. The arrangement as claimed in claim 3, wherein the communication device on the side of the connector has an RFID and/or is designed to transmit the at least one item of power transport information via a Bluetooth connection and/or via a data network, wherein the communication device on the motor vehicle side is designed to activate the RFID on the side of the connector and/or to receive the at least one transmitted item of power transport information via a Bluetooth connection and/or via the data network.

5. The arrangement as claimed in claim 1, wherein the connector has at least one resistance element which is connected or connectable in an electrically conducting manner to a pair of contacts of the first coupling, said resistance element is designed to encode the power transport information or one of the items of power transport information, wherein the motor vehicle has a measurement device which is designed to detect the encoded power transport information or at least one of the items of the encoded power transport information by measuring at least one resistance value between at least one pair of contacts of the charging connection.

6. The arrangement as claimed in claim 5, wherein the measurement device is designed to measure the resistance value or one of the resistance values at a pair of contacts not provided for the power transport, including at least one pilot contact and/or one grounded contact.

7. The arrangement as claimed in claim 1, wherein an additional item of power transport information describes whether the energy sink is in contact with the connector, especially its second coupling, wherein the charging device is designed for the purpose of disabling the providing of an output voltage until a contact of the energy sink with the connecting means is ascertained.

8. The arrangement as claimed in claim 7, wherein the measurement device or a measurement device on the motor vehicle side is designed to obtain the additional item of power transport information by measuring a resistance value between a pair of contacts contributing to the power transport, especially including an external conductor and a neutral conductor, of the charging connection.

9. The arrangement as claimed in claim 1, wherein the charging device is designed to allow the power transport only upon receiving an operating signal generated by an operating input, which signal can be generated by activating at least one operating element on the motor vehicle side, especially an operating element on the side of the charging connection and/or an operating element situated in the interior of the motor vehicle, and/or by a radio signal received via a data radio interface on the motor vehicle side, especially a portable communication device.

10. The arrangement as claimed in claim 1, wherein a locking element on the motor vehicle side is provided, said locking element being designed to lock the connector in a state plugged into the charging connection on the motor vehicle, whereby said locking occurs depending on the evaluation result.

11. The arrangement as claimed in claim 1, wherein a display device is provided on the side of the charging connection and/or in the interior of the motor vehicle, said display device being able to be controlled by the charging device to visualize the power transport, especially its direction.

12. The arrangement as claimed in claim 1, wherein the motor vehicle includes a receptacle for a power plug installed in its interior, wherein the charging device is moreover designed to specify an additional power transport in the direction of the receptacle and to enable the power transport in the direction of the receptacle only upon detecting a consumer plugged into the receptacle.

13. A charging arrangement as claimed in claim 1, wherein the second coupling comprises contacts, especially female contacts, which are designed for plugging in a power plug or a charging cable for another motor vehicle.

14. An arrangement of a motor vehicle, comprising:
a battery, a charging connection and a charging device connected between the battery and the charging connection, and
a connector which has a first coupling, which is connectable to and detachable from the charging connection of the motor vehicle, and a second coupling, which is connectable to and detachable from an energy sink for power transport from the motor vehicle to the energy sink,
wherein the connector is formed as a common housing in which the first coupling and the second coupling are arranged,
wherein the connector is designed for providing at least one item of power transport information to the motor vehicle,
wherein the connector comprises a controller and a communication device,
wherein the controller stores the power transport information or one of the items of the power transport information and actuates the communication device by which the power transport information or one of the items of the power transport information can be transmitted wirelessly from the connector to the motor vehicle,
wherein the charging device is designed for evaluating the power transport information or one of the items of power transport information and for specifying the direction of the power transport between the battery and the charging connection, depending on the result of the evaluation,
wherein the power transport information or one of the items of the power transport information further comprises information describing a type of the connector and/or a connector-specific identifier specific to the connector,
wherein the charging device comprises a data storage unit which stores a database containing information which relates the type of the connector and/or the connector-specific identifier to at least permissible voltages and/or frequencies and/or maximum current strengths, and
wherein, upon receipt of the power transport information or one of the items of the power transport information, the charging device is configured to retrieve the permissible voltages and/or frequencies and/or maximum current strengths from the data storage unit for carrying out the power transport.

* * * * *